(12) United States Patent
Kira et al.

(10) Patent No.: US 9,971,439 B2
(45) Date of Patent: May 15, 2018

(54) TOUCH-PANEL-EQUIPPED DISPLAY DEVICE

(71) Applicant: Sharp Kabushiki Kaisha, Sakai, Osaka (JP)

(72) Inventors: Takatoshi Kira, Sakai (JP); Tomotoshi Tsujioka, Sakai (JP); Shinichi Miyazaki, Sakai (JP); Kohji Yabuta, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days. days.

(21) Appl. No.: 15/126,308

(22) PCT Filed: Feb. 26, 2015

(86) PCT No.: PCT/JP2015/055667
§ 371 (c)(1),
(2) Date: Sep. 15, 2016

(87) PCT Pub. No.: WO2015/146462
PCT Pub. Date: Oct. 1, 2015

(65) Prior Publication Data
US 2017/0083136 A1 Mar. 23, 2017

(30) Foreign Application Priority Data
Mar. 28, 2014 (JP) .................... 2014-070016

(51) Int. Cl.
*G06F 3/045* (2006.01)
*G06F 3/041* (2006.01)
(Continued)

(52) U.S. Cl.
CPC ........ *G06F 3/0412* (2013.01); *G02F 1/13338* (2013.01); *G02F 1/13439* (2013.01);
(Continued)

(58) Field of Classification Search
CPC ....... G06F 3/044; G06F 3/0412; G06F 3/0416
See application file for complete search history.

(56) References Cited

U.S. PATENT DOCUMENTS

| | | |
|---|---|---|
| 2009/0244028 A1 | 10/2009 | Matsuo |
| 2013/0063371 A1 | 3/2013 | Lee et al. |
| 2014/0055685 A1* | 2/2014 | Wang .................... G06F 3/0412 349/12 |

FOREIGN PATENT DOCUMENTS

| | | |
|---|---|---|
| JP | 2010-257492 A | 11/2010 |
| JP | 2013-058180 A | 3/2013 |
| JP | 2013-225195 A | 10/2013 |

OTHER PUBLICATIONS

Official Communication issued in International Patent Application No. PCT/JP2015/055667, dated May 19, 2015.

* cited by examiner

*Primary Examiner* — Nan-Ying Yang
(74) *Attorney, Agent, or Firm* — Keating & Bennett, LLP

(57) ABSTRACT

A configuration of a touch-panel-equipped display device in which the occurrence of moire can be suppressed is provided. A touch-panel-equipped display device (1) includes: a color filter layer (121) that includes a plurality of pixels (PX) arranged in matrix along a first direction and a second direction that intersect at a right angle; and a sensor pattern layer (1220) that includes a plurality of electrodes (1220) arranged along the second direction at a predetermined sensor interval (SY) and is disposed so as to overlap the color filter layer (121) in a plan view. Each of the plurality of pixels (PX) includes n color filters (121R, 121G, 121B) that transmit light in different wavelength regions from one another, where n represents an integer of 3 or more. The n color filters are arranged at predetermined subpixel intervals (Continued)

(CSFY) along the second direction. The sensor interval (SY) and the subpixel interval (CSFY) satisfy the following expression (1):

$$CFSY \times (n \times m+1) \leq SY \leq CFSY \times (n \times (m+1)-1) \quad (1)$$

where m represents a positive integer.

3 Claims, 13 Drawing Sheets

(51) Int. Cl.
  *G06F 3/044* (2006.01)
  *G02F 1/1333* (2006.01)
  *G02F 1/1335* (2006.01)
  *G02F 1/1343* (2006.01)
(52) U.S. Cl.
  CPC .. *G02F 1/133514* (2013.01); *G02F 1/134309* (2013.01); *G06F 3/044* (2013.01)

| Pitch ratio | 0.9 | 1 | 1.1 | 1.2 | 1.3 | 1.4 | 1.5 | 1.6 | 1.7 | 1.8 | 1.9 | 2 | 2.1 |
|---|---|---|---|---|---|---|---|---|---|---|---|---|---|
| Pixel pitch (μm) 52 | × | × | × | △ | △ | ○ | ○ | ○ | ○ | ○ | ○ | △ | △ |
| 57 | × | × | × | △ | △ | ○ | ○ | ○ | ○ | ○ | ○ | △ | △ |
| 60 | × | × | × | △ | △ | ○ | ○ | ○ | ○ | ○ | ○ | △ | △ |
| 64 | × | × | × | △ | △ | ○ | ○ | ○ | ○ | ○ | ○ | △ | △ |
| 70 | × | × | × | △ | △ | ○ | ○ | ○ | ○ | ○ | ○ | △ | △ |
| 79 | × | × | × | △ | △ | ○ | ○ | ○ | ○ | ○ | ○ | △ | △ |
| 90 | × | × | × | △ | △ | ○ | ○ | ○ | ○ | ○ | ○ | △ | △ |

Fig. 8

| CFX | | 3 pixels | | | | | | | |
|---|---|---|---|---|---|---|---|---|---|
| CFSY | | 1 pixel | 2 pixels | 3 pixels | 4 pixels | 5 pixels | 6 pixels | 8 pixels | 9 pixels |
| Conversion bias | | About 6 degrees | About 12 degrees | About 18 degrees | About 24 degrees | About 29 degrees | About 34 degrees | About 42 degrees | About 45 degrees |
| Pixel pitch (μm) | 57 | △ | ○ | ○ | ○ | ○ | ○ | ○ | △ |
| | 64 | △ | ○ | ○ | ○ | ○ | ○ | △ | △ |
| | 70 | ○ | ○ | ○ | ○ | ○ | ○ | ○ | △ |
| | 90 | △ | ○ | ○ | ○ | ○ | ○ | ○ | △ |

Fig. 9

TOUCH-PANEL-EQUIPPED DISPLAY DEVICE

TECHNICAL FIELD

The present invention relates to a touch-panel-equipped display device.

BACKGROUND ART

Conventionally, a configuration of a touch-panel-equipped display device wherein a touch panel is located on the display device has been known. A touch-panel-equipped display device has a problem that sensors of the touch panel are visible to a user, which deteriorates the display quality of the display device.

JP-A-2010-257492 discloses an electrostatic capacitance type input device that includes: a translucent substrate; a multilayer film that is formed on one of surfaces of the translucent substrate and that includes a plurality of translucent thin films that have different refractive indices, respectively, wherein one of the plurality of translucent thin films is a niobium oxide film; a plurality of first translucent electrodes that extend in a first direction; and a plurality of second translucent electrodes that extend in a second direction that intersects the first direction.

JP-A-2013-58180 discloses a touch panel that includes: a transparent substrate; a first metal electrode that is formed on one of surfaces of the transparent substrate, and is formed with first unit electrode lines repeatedly arrayed in parallel with one another; and a second metal electrode that is formed on the other surface of the transparent substrate, and is formed with second unit electrode lines repeatedly arrayed in parallel with one another, the second unit electrode lines intersecting the first unit electrode lines at right angles. The foregoing document discusses that with the configuration in which the first metal electrode or the second metal electrode, in a specific shape, is provided on each surface of the transparent substrate in combination, moire can be reduced.

SUMMARY OF THE INVENTION

In a touch-panel-equipped display device, moire occurs due to interference between sensors and the display device in some cases. Even if the visibility of the sensors of the touch panel is decreased, the deterioration of the display quality due to moire is not solved in some cases.

It is an object of the present invention to obtain a configuration of a touch-panel-equipped display device that enables suppressing the occurrence of moire.

A touch-panel-equipped display device disclosed herein includes: a color filter layer including a plurality of pixels that are arranged in matrix along a first direction and a second direction that intersect at a right angle; and a sensor pattern layer including a plurality of electrodes that are arranged along the second direction at a predetermined sensor interval SY, the sensor pattern layer being arranged so as to overlap the color filter layer when viewed in a direction vertical to the first direction and the second direction. Each of the pixels includes n color filters that transmit light in wavelength ranges different from one another, respectively, where n is an integer of 3 or more. The n color filters are arranged along the second direction at a predetermined subpixel interval CSFY. The sensor interval SY and the subpixel interval CSFY satisfy an expression (1) below:

$$CFSY \times (n \times m+1) \leq SY \leq CFSY \times (n \times (m+1)-1) \quad (1)$$

where m is a positive integer.

According to the present invention, a configuration of a touch-panel-equipped display device that enables suppressing the occurrence of moire can be obtained.

BRIEF DESCRIPTION OF DRAWINGS

FIG. 8 is a table illustrating the relationship between the pixel interval CFX as well as the sensor interval SY, and the occurrence/non-occurrence of moire.

FIG. 9 is a table illustrating the relationship between the pixel interval CFX as well as the bias angle $\theta$, and the occurrence/non-occurrence of moire.

MODE FOR CARRYING OUT THE INVENTION

Figure 1:
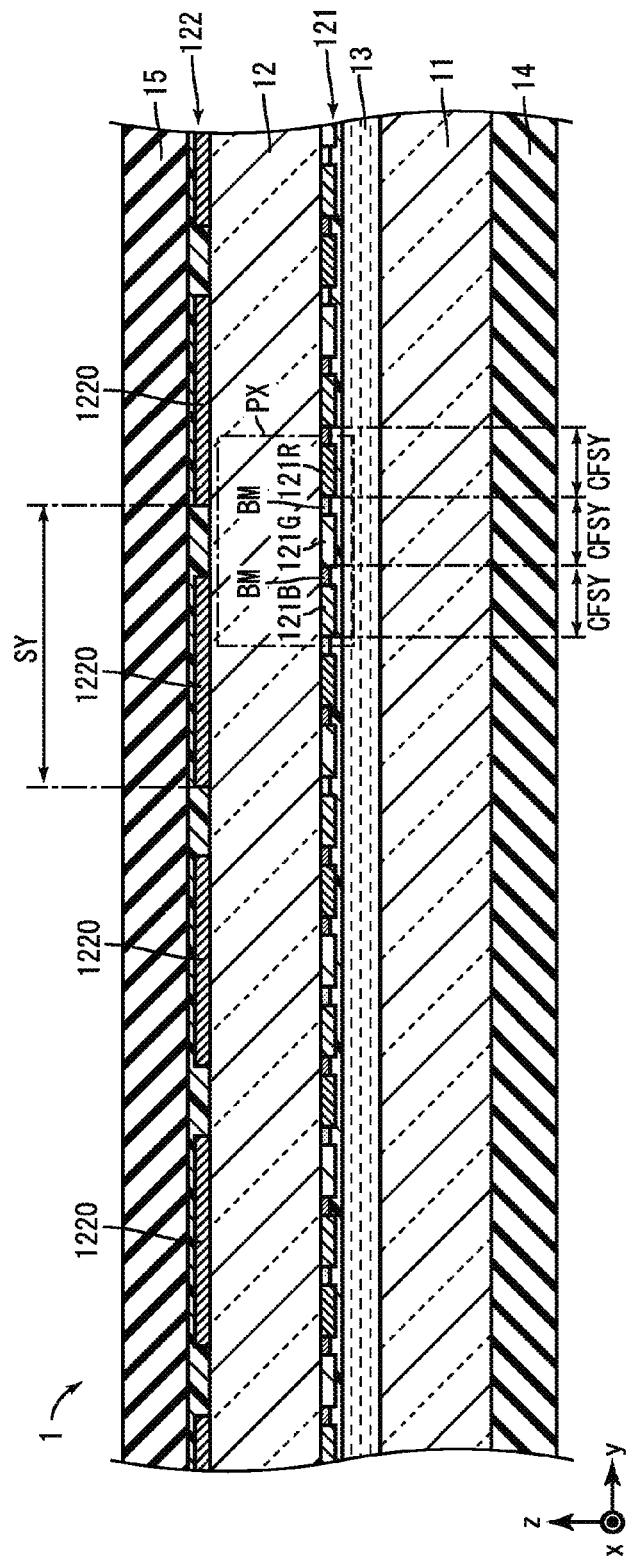
FIG. 1 is a cross-sectional view schematically illustrating a configuration of a touch-panel-equipped display device according to Embodiment 1 of the present invention.

A touch-panel-equipped display device according to one embodiment of the present invention includes: a color filter layer including a plurality of pixels that are arranged in matrix along a first direction and a second direction that intersect at a right angle; and a sensor pattern layer including a plurality of electrodes that are arranged along the second direction at a predetermined sensor interval SY, the sensor pattern layer being arranged so as to overlap the color filter layer when viewed in a direction vertical to the first direction and the second direction. Each of the pixels includes n color filters that transmit light in wavelength ranges different from one another, respectively, where n is an integer of 3 or more. The n color filters are arranged along the second direction at a predetermined subpixel interval CSFY. The sensor interval SY and the subpixel interval CSFY satisfy the following expression (1):

$$CFSY \times (n \times m+1) \leq SY \leq CFSY \times (n \times (m+1)-1) \quad (1)$$

where m is a positive integer (the first configuration).

With the above-described configuration, each pixel in the color filter layer includes n color filters that are arranged along the second direction at a predetermined subpixel interval CSFY. The n color filters transmit light in wavelength ranges different from one another. The touch-panel-equipped display device allows light to be transmitted through these n color filters, thereby displaying arbitrary colors by additive color mixture.

With the above-described configuration, the sensor pattern layer includes a plurality of electrodes that are arranged along the second direction at a predetermined sensor interval SY. The parts with the electrodes and the parts without the electrodes have different light transmittances. This causes brightness and darkness resulting from the pattern of the sensor pattern layer to be visible to a viewer in some cases. Particularly, when areas where the parts without the electrodes and the color filters of respective colors overlap are out of balance, the transmitted light appears colored in some case. Such color deviation causes moire.

With the above-described configuration, by setting the sensor interval SY and the subpixel interval CSFY appropriately, the color deviation is suppressed. More specifically, satisfying the following expression (1) makes it possible to reduce the color deviation and to suppress the occurrence of moire.

In the above-described first configuration, preferably, the "n" representing the number of the color filters is 3, and the following expression (2) is satisfied (the second configuration):

$$CFSY \times 4 \leq SY \leq CFSY \times 5 \quad (2).$$

In the second configuration, preferably, the pixels are arranged along the first direction at a predetermined pixel interval CFX, each of the transparent electrodes is formed so that a bias angle θ is formed between the electrode and the first direction, and the subpixel interval CSFY, the pixel interval CFX, and the bias angle satisfy the following expression (3) (the third configuration):

$$a\tan(2/3 \times CFSY/CFX) \leq \theta \leq a\tan(2 \times CFSY/CFX) \quad (3)$$

With the above-described configuration, the color deviation can be reduced in the first direction as well. This makes it possible to suppress the occurrence of moire further.

In the third configuration, preferably, each of the electrodes is turned every ½ of a predetermined cycle SPN along the first direction in such a manner that an angle formed between the electrode and the first direction is reversed, and the subpixel interval CSFY, the bias angle θ, and the cycle SPN satisfy the following expression (4) (the fourth configuration):

$$SPN \geq (6 \times CFSY)/\text{TAN}(\theta) \quad (4)$$

According to the above-described configuration, the electrode is turned every ½ of the predetermined cycle SPN, whereby the electrode can be formed approximately in a linear form parallel to the first direction over a long section, which increases the degree of freedom for layout of the sensor pattern layer. The cycle SPN satisfies the expression (4), whereby local color deviation can be eliminated.

In the above-described fourth configuration, preferably, the subpixel interval CSFY, the bias angle θ, and the cycle SPN satisfies the following expression (5) (the fifth configuration):

$$SPN = (6 \times CFSY)/\text{TAN}(\theta) \quad (5)$$

With the above-described configuration, the amplitude of the electrode in the second direction can be minimized within such a range that the coloring balance is not lost. This allows the degree of freedom for layout of the sensor pattern layer to be improved.

[Embodiment]

The following describes embodiments of the present invention in detail, while referring to the drawings. In the drawings, identical or equivalent parts in the drawings are denoted by the same reference numerals, and the descriptions of the same are not repeated. To make the explanation easy to understand, in the drawings referred to hereinafter, the configurations are simplified or schematically illustrated, or a part of constituent members are omitted. Further, the dimension ratios of the constituent members illustrated in the drawings do not necessarily indicate the real dimension ratios.

Embodiment 1

[Configuration of Touch-Panel-Equipped Display Device]

FIG. 1 is a cross-sectional view schematically illustrating a configuration of a touch-panel-equipped display device 1 according to Embodiment 1 of the present invention. The touch-panel-equipped display device 1 includes: an active matrix substrate 11 and a color filter substrate 12 that are arranged so as to be opposed to each other; a liquid crystal layer 13 sealed between these substrates; and polarizing plates 14 and 15.

For convenience of explanation, the x direction (first direction), the y direction (second direction), and the z direction are set as illustrated in FIG. 1. The x direction, the y direction, and the z direction intersect at right angles. The direction parallel with the thickness direction of the touch-panel-equipped display device 1 is defined as the z direction.

On the active matrix substrate 11, a plurality of pixel electrodes are formed, though a detailed configuration thereof is not shown. The touch-panel-equipped display device 1 forms an electric field in the liquid crystal layer 13 by controlling respective potentials of the pixel electrodes, thereby changing the polarization state of light that is transmitted through the liquid crystal layer 13.

The touch-panel-equipped display device 1 allows particular polarized light to be transmitted therethrough, by using the polarizing plate 14, causes the polarization state of the light to be changed by the liquid crystal layer 13, and allows particular polarized light to be transmitted therethrough, by using the polarizing plate 15. With this configuration, the touch-panel-equipped display device 1 is capable of displaying an arbitrary image. As the method for driving the liquid crystal layer 13, an arbitrary known driving method can be used.

On one of surfaces of the color filter substrate 12, a color filter layer 121 is formed, and on the other surface of the same, a sensor pattern layer 122 is formed. The color filter layer 121 and the sensor pattern layer 122 are arranged so that the color filter substrate 12 is interposed therebetween, and so as to overlap each other when viewed in the z axis direction. The color filter layer 121 is arranged between the color filter substrate 12 and the liquid crystal layer 13, and the sensor pattern layer 122 is arranged between the color filter substrate 12 and the polarizing plate 15.

The color filter layer 121 includes a plurality of pixels PX. Each of the pixels PX includes a red color filter 121R, a green color filter 121G, a blue color filter 121B, and a black matrix BM provided therebetween. The color filters 121R, 121G, and 121B are arranged along the y direction at a subpixel interval CFSY.

The sensor pattern layer 122 includes a plurality of electrodes 1220 formed at a predetermined interval. Each of the electrodes 1220 is formed with, for example, a transparent conductive film made of indium tin oxide (ITO) or the like. The electrodes 1220 are arranged along the y direction at a sensor interval SY.

When a finger or the like approaches the touch-panel-equipped display device 1, electrostatic capacitances of the electrodes 1220 change. The touch-panel-equipped display device 1 measures an electrostatic capacitance of each electrode 1220, and by so doing, calculates coordinates of the finger or the like that has approached the touch-panel-equipped display device 1.

There may be formed an index matching layer, between the color filter substrate 12 and the sensor pattern layer 122, between the sensor pattern layer 122 and the polarizing plate 15, or at both positions. The index matching layer adjusts the refractive index, so as to increase the transmittance of the electrodes 1220, thereby improving the optical properties of the sensor pattern layer 122.

Figure 2:
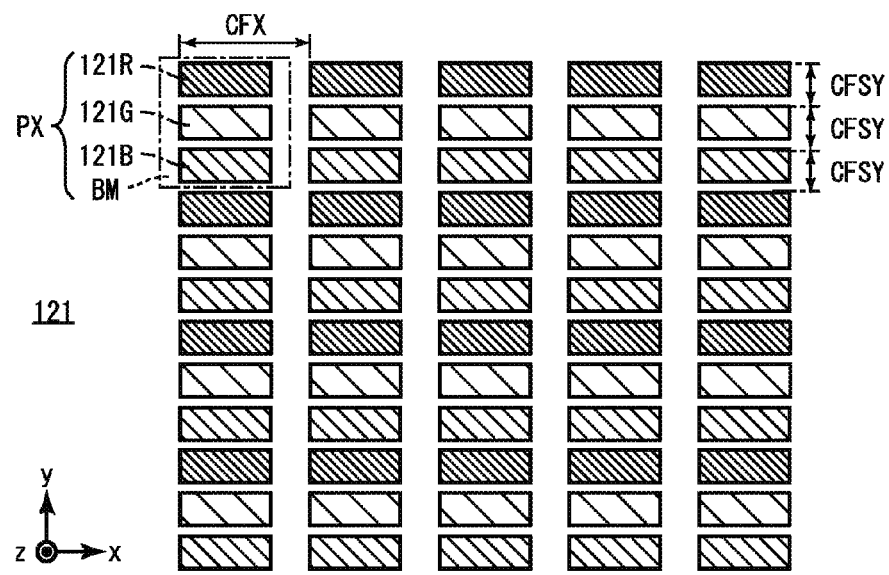
FIG. 2 is a plan view illustrating a configuration of a color filter layer.

FIG. 2 is a plan view illustrating a configuration of the color filter layer 121. In FIG. 2, hatching patterns are applied to the color filters 121R, 121G, and 121B. This is intended to schematically represent the respective colors of the color filters 121R, 121G, 121B by using hatching patterns, and does not illustrate a cross-sectional structure. The same applies to FIGS. 6A to 6D, FIGS. 7A to 7D, and FIGS. 11A to 11D to be referred to below.

As described above, the color filter layer 121 includes a plurality of pixels PX. Each of the pixels PX includes the color filters 121R, 121G, and 121B. The color filters 121R, 121G, and 121B are arranged along the y direction at a subpixel interval CFSY.

As illustrated in FIG. 2, the plurality of pixels PX are arranged in matrix along the x direction and the y direction. The pixels PX are arranged along the x direction at a pixel interval CFX, and along the y direction at an interval (3×CFSY) three times the subpixel interval CFSY.

Figure 3:
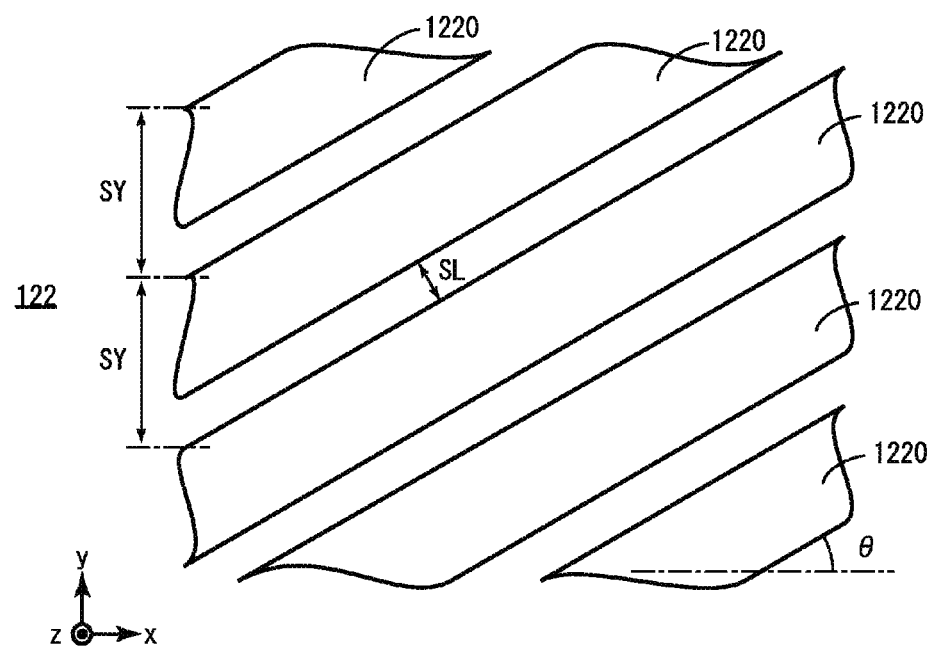
FIG. 3 is a plan view illustrating a configuration of a sensor pattern layer.

FIG. 3 is a plan view illustrating a configuration of the sensor pattern layer 122. As described above, the sensor pattern layer 122 includes the plurality of electrodes 1220 arranged along the y direction at a sensor interval SY. Each of the electrodes 1220 is formed so that a bias angle θ is formed between the electrode and the x direction.

From the viewpoint of properties of the sensor pattern layer 122, the length SL of clearance between the electrodes 1220 is preferably shorter. If the length SL of the clearance is too short, however, the electrodes 1220 are easily short-circuited, and the yield of the touch-panel-equipped display device 1 decreases. For these reasons, the length SL of the clearance is usually set to be approximately equal to the subpixel interval CFSY.

In the touch-panel-equipped display device 1, the sensor interval SY, the pixel interval CFX, the subpixel interval CFSY, and the bias angle θ satisfy the following expressions (2) and (3):

$$CFSY \times 4 \leq SY \leq CFSY \times 5 \quad (2)$$

$$a\tan(2/3 \times CFSY/CFX) \leq \theta \leq a\tan(2 \times CFSY/CFX) \quad (3)$$

[Effects of Touch-Panel-Equipped Display Device 1]

Figure 4:
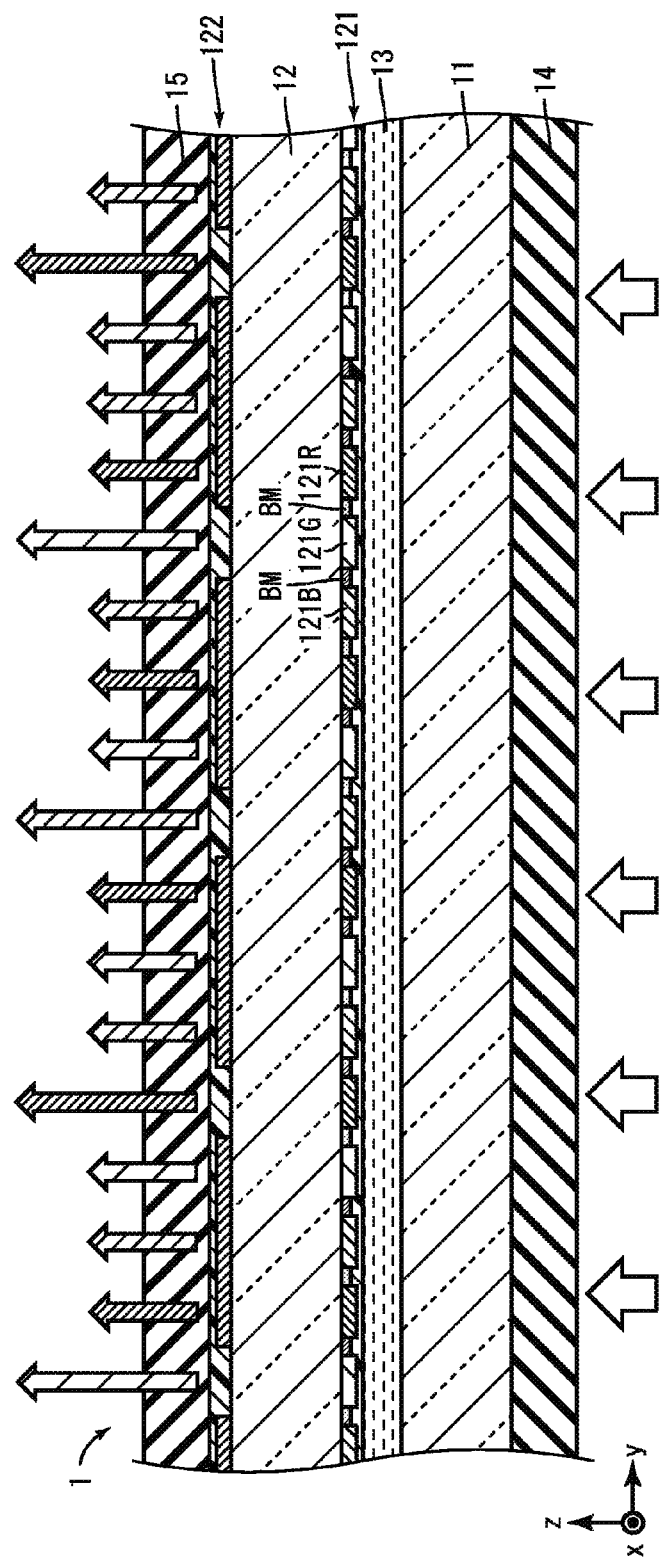
FIG. 4 is a schematic cross-sectional view for explaining effects of the touch-panel-equipped display device.
Figure 5:
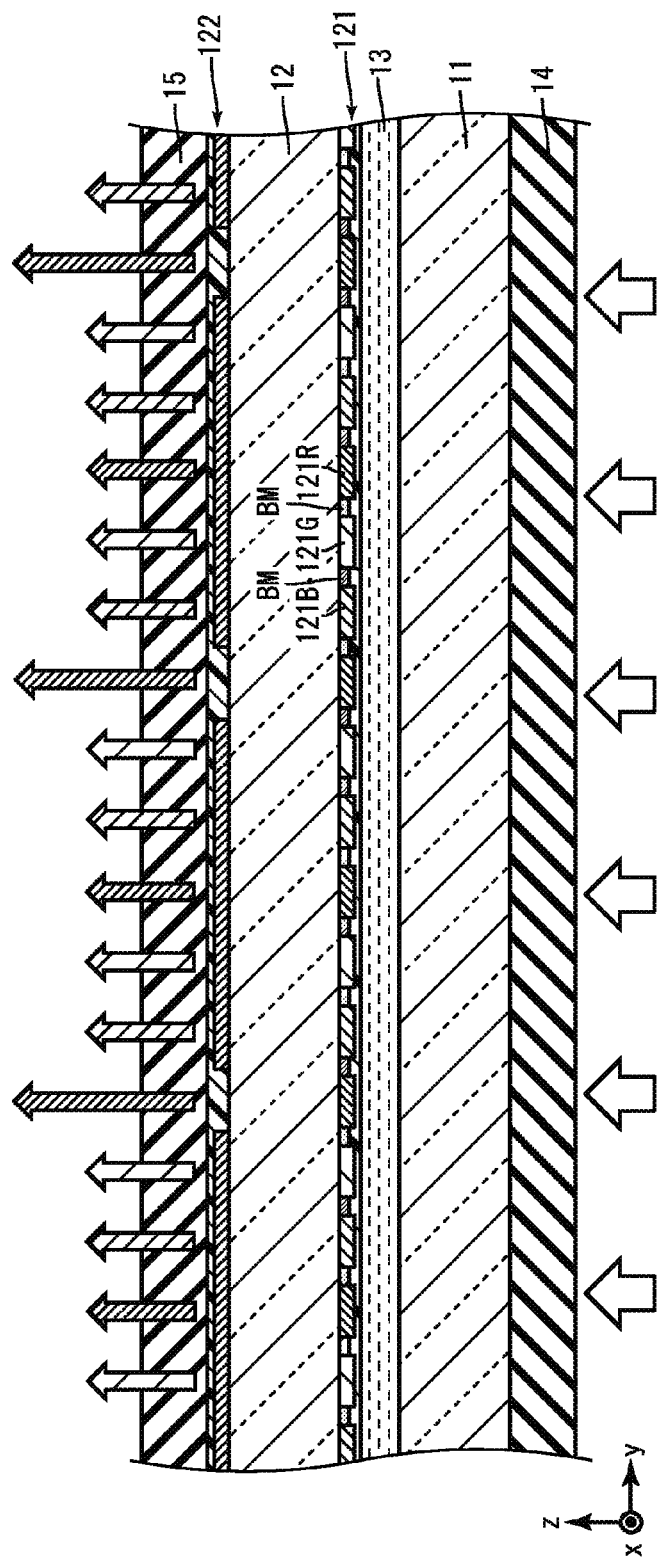
FIG. 5 illustrates an example in a case where the setting of a sensor interval SY is inappropriate.

FIG. 4 is a schematic cross-sectional view for explaining the effects of the touch-panel-equipped display device 1. The touch-panel-equipped display device 1 is irradiated with light from a light source (not shown) toward the polarizing plate 14. In FIG. 4 and FIG. 5 to be described below, the light irradiated to the touch-panel-equipped display device 1 is schematically illustrated with void arrows. Further, light having passed through the color filter layer 121 is schematically illustrated with arrows to which the same hatching patterns as those for the color filters that the light has passed through are applied. Luminance of the light having passed through the color filter layer 121 is schematically illustrated with lengths of the arrows.

In the sensor pattern layer 122, parts thereof where the electrodes 1220 are formed and parts thereof where the electrodes 1220 are not formed have different light transmittances. More specifically, light having passed through the electrodes 1220 is darker as compared with light having passed through the parts where the electrodes 1220 are not formed. Therefore, if respective areas of overlap between the parts without the electrodes 1220 and the respective color filters are out of balance, transmitted light appears colored in a particular color in some cases.

In the present embodiment, the sensor interval SY is appropriately set. Therefore, the respective areas of overlap between the parts without the electrodes 1220 and the color filters of the respective colors are equal to one another.

FIG. 5 illustrates an example in which the setting of the sensor interval SY is inappropriate. In the example in FIG. 5, parts without the electrodes 1220 and the color filters 121R are present substantially at the same cycles in the y direction. This causes an area of overlap between the parts without the electrodes 1220 and the color filters 121R to become larger than an area of overlap between the forgoing parts and the color filters of the other colors. In this way, if the parts without the electrodes 1220 and the color filters of a particular color overlap in a narrow region, the region appears colored with the particular color of the color filters. If regions that appear colored with the respective colors of red, green, and blue occur cyclically, this is viewed as moire.

Hereinafter, the settings of the sensor interval SY and the bias angle θ are described in detail.

[Setting of Sensor Interval SY]

FIGS. 6A to 6D are plan views illustrating the color filter layer 121 and four types of sensor pattern layers 122 that are different regarding the sensor intervals SY, respectively, in a state in which the color filter layer 121 and the sensor pattern layer 122 overlap each other.

Figure 6A:
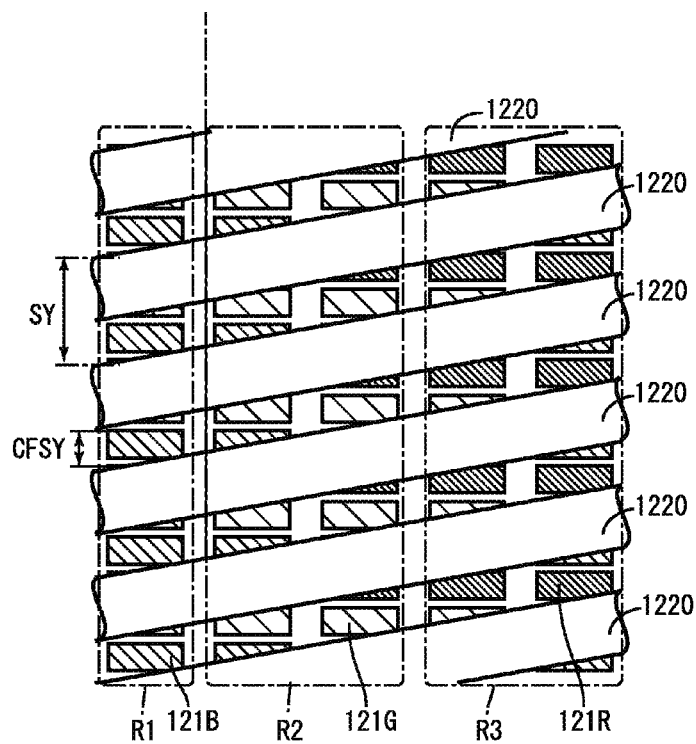
FIG. 6A is a plan view illustrating the color filter layer and the sensor pattern layer in an overlapped state, in a case where the sensor interval SY is set to three times the subpixel interval CFSY.

FIG. 6A is a view in a case where the sensor interval SY is set to three times the subpixel interval CFSY. In this example, in a region R1, an area of overlap between the parts without the electrodes 1220 and the color filters 121B is larger as compared with an area of overlap between the parts without the electrodes 1220 and the color filters of the other colors. This causes the region R1 to appear colored with blue. Similarly, the region R2 appears colored with green, and the region R3 appears colored with red.

Figure 6B:
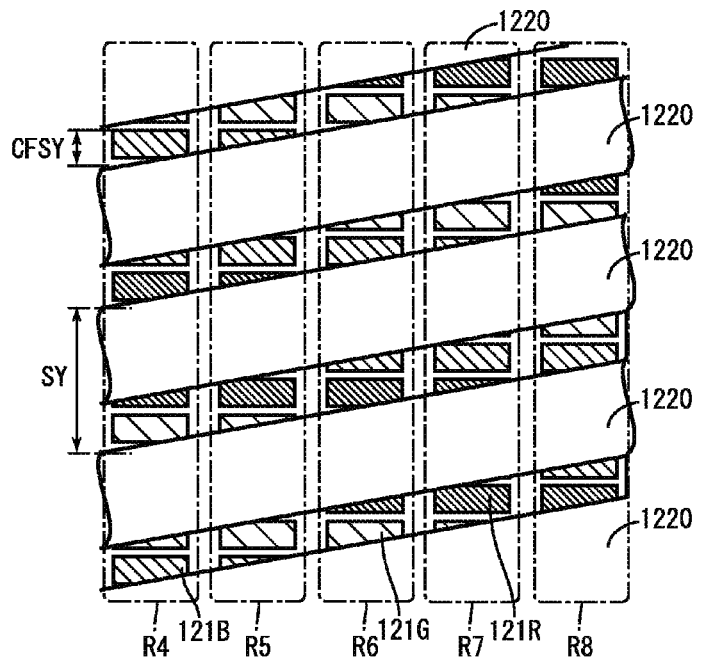
FIG. 6B is a plan view illustrating the color filter layer and the sensor pattern layer in an overlapped state, in a case where the sensor interval SY is set to four times the subpixel interval CFSY.

FIG. 6B is a view in a case where the sensor interval SY is set to be four times the subpixel interval CFSY. In this example, in each of the regions R4 to R8, respective areas of overlap between the parts without the electrodes 1220 and the color filters of the respective colors are equal to one another.

Figure 6C:
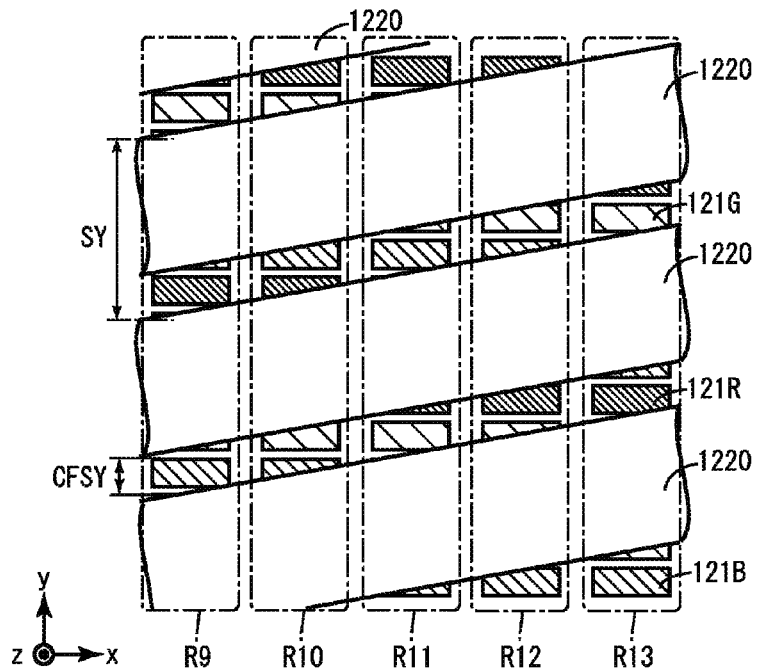
FIG. 6C is a plan view illustrating the color filter layer and the sensor pattern layer in an overlapped state, in a case where the sensor interval SY is set to five times the subpixel interval CFSY.

FIG. 6C is a view in a case where the sensor interval SY is set to be five times the subpixel interval CFSY. In this example as well, in each of the regions R9 to R13, respective areas of overlap between the parts without the electrodes 1220 and the color filters of the respective colors are equal to one another.

Figure 6D:
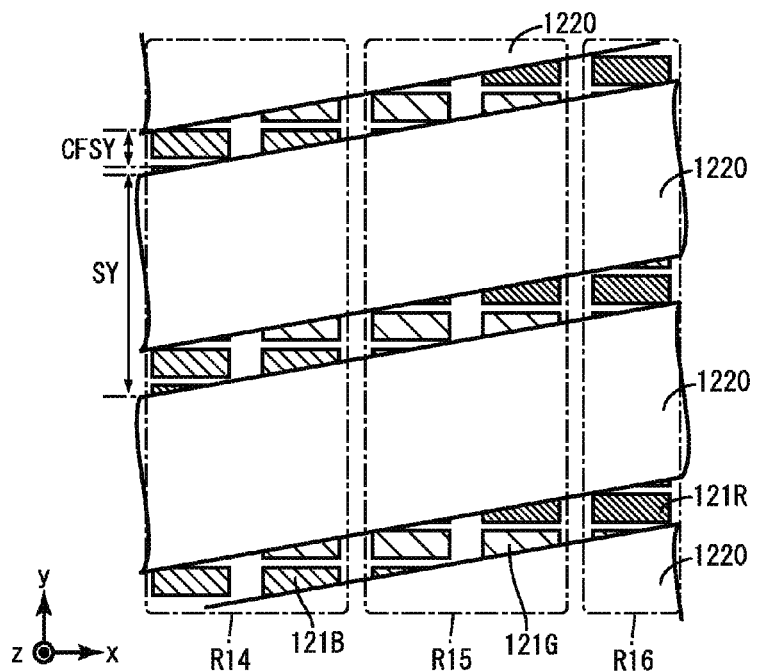
FIG. 6D is a plan view illustrating the color filter layer and the sensor pattern layer in an overlapped state, in a case where the sensor interval SY is set to six times the subpixel interval CFSY.

FIG. 6D is a view in a case where the sensor interval SY is set to be six times the subpixel interval CFSY. In this example, in the region R14, an area of overlap between the parts without the electrodes 1220 and the color filter 121B is larger as compared with an area of overlap between the parts without the electrodes 1220 and the color filters of the other colors. This causes the region R14 to appear colored with blue. Similarly, the region R15 appears colored with green, and the region R16 appears colored with red.

In this way, moire occurs when the sensor interval SY is an integer multiple of 3×CFSY. When the sensor interval SY is in a range satisfying the following expression (2), moire is at an unrecognizable level.

$$CFSY \times 4 \leq SY \leq CFSY \times 5 \tag{2}$$

[Setting of Bias Angle θ]

FIGS. 7A to 7D are plan views illustrating the color filter layer 121 and four types of sensor pattern layers 122 that are different regarding the bias angle θ, respectively, in a state in which the color filter layer 121 and the sensor pattern layer 122 overlap each other.

Figure 7A:
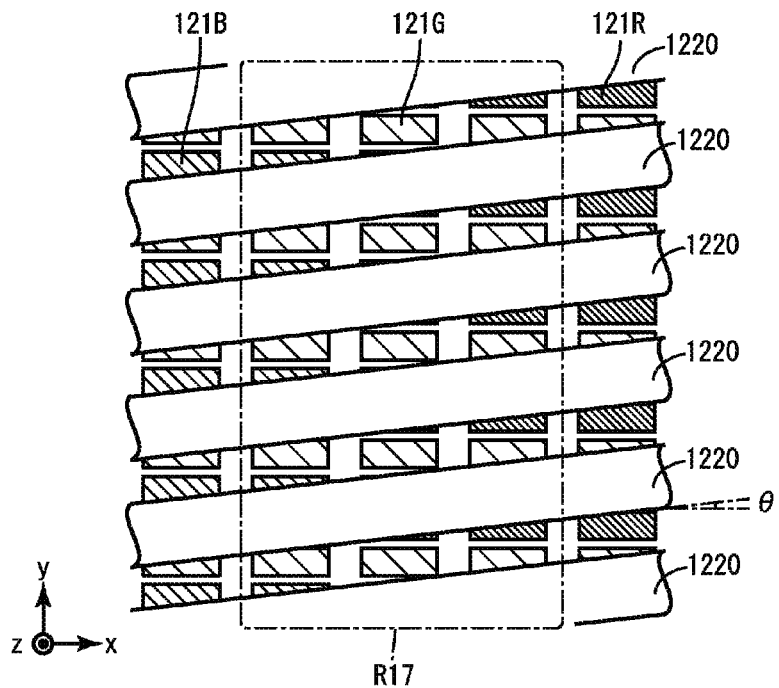
FIG. 7A is a plan view illustrating the color filter layer and the sensor pattern layer in an overlapped state, in a case where $\theta = a\tan(1/3 \times CFSY/CFX)$ is satisfied.

FIG. 7A is a view in a case where θ=a tan(1/3×CFSY/CFX) is set. In other words, FIG. 7A is a view in a case where the bias angle θ is set so that with a shift in the x direction over a distance equal to the pixel interval CFX, an edge of the electrode 1220 shifts in the y direction over a distance of one third of the subpixel interval CFSY. When the aspect ratio of the pixel PX is 1, that is, CFX=3×CFSY, the bias angle θ is about 6 degrees.

In this example, in the region R17, an area of overlap between the parts without the electrodes 1220 and the color filters 121G is larger as compared with an area of overlap between the parts without the electrodes 1220 and the color filters of the other colors. In this example, the length of the region R17 in the x direction is three times the pixel interval CFX.

Figure 7B:
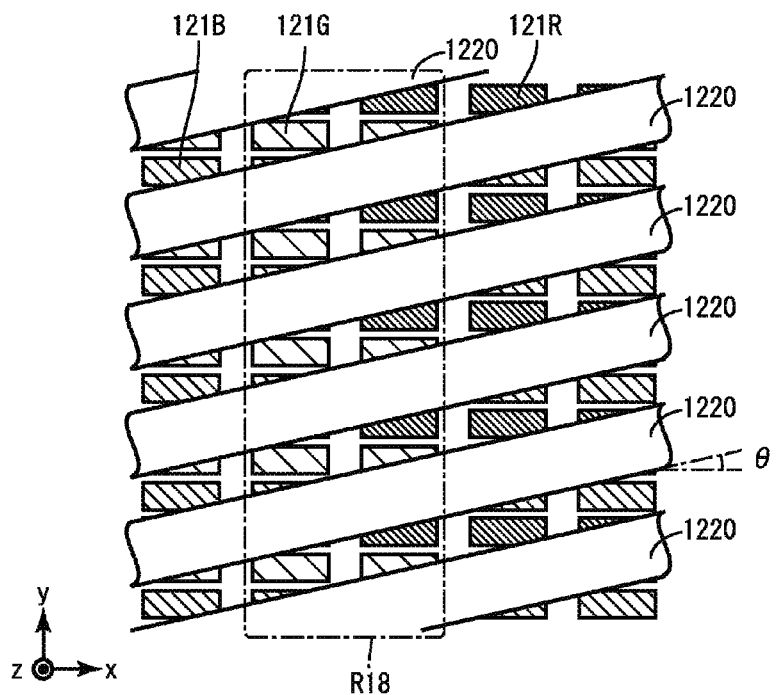
FIG. 7B is a plan view illustrating the color filter layer and the sensor pattern layer in an overlapped state, in a case where $\theta = a\tan(2/3 \times CFSY/CFX)$ is satisfied.

FIG. 7B is a view in a case where θ=a tan(2/3×CFSY/CFX) is set. In other words, FIG. 7B is a view in a case where the bias angle θ is set so that with a shift in the x direction over a distance equal to the pixel interval CFX, an edge of the electrode 1220 shifts in the y direction over a distance of two thirds of the subpixel interval CFSY. When the aspect ratio of the pixel PX is 1, that is, CFX=3×CFSY, the bias angle θ is about 12 degrees.

In this example, in the region R18, an area of overlap between the parts without the electrodes 1220 and the color filters 121G is larger as compared with an area of overlap between the parts without the electrodes 1220 and the color filters of the other colors. In this example, the length of the region R18 in the x direction is twice the pixel interval CFX.

Figure 7C:
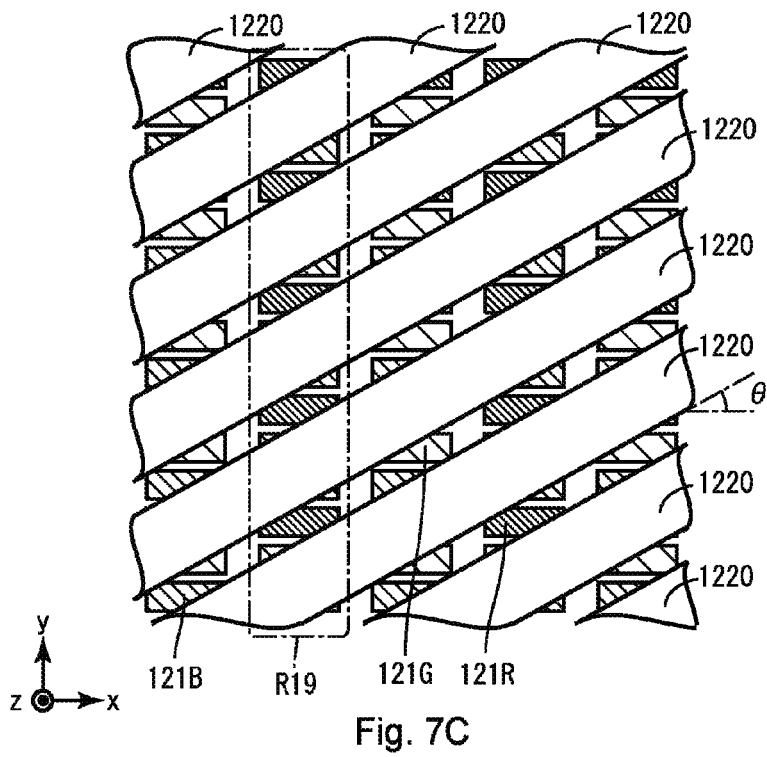
FIG. 7C is a plan view illustrating the color filter layer and the sensor pattern layer in an overlapped state, in a case where $\theta = a\tan(5/3 \times CFSY/CFX)$ is satisfied.

FIG. 7C is a view in a case where θ=a tan(5/3×CFSY/CFX) is set. In other words, FIG. 7C is a view in a case where the bias angle θ is set so that with a shift in the x direction over a distance equal to the pixel interval CFX, an edge of the electrode 1220 shifts in the y direction over a distance of three fifths of the subpixel interval CFSY. When the aspect ratio of the pixel PX is 1, in other words, CFX=3×CFSY, the bias angle θ is about 29 degrees.

In this example, in the region R19, an area of overlap between the parts without the electrodes 1220 and the color filters 121R is larger as compared with an area of overlap between the parts without the electrodes 1220 and the color filters of the other colors. In this example, the length of the region R19 in the x direction is once the pixel interval CFX.

Figure 7D:
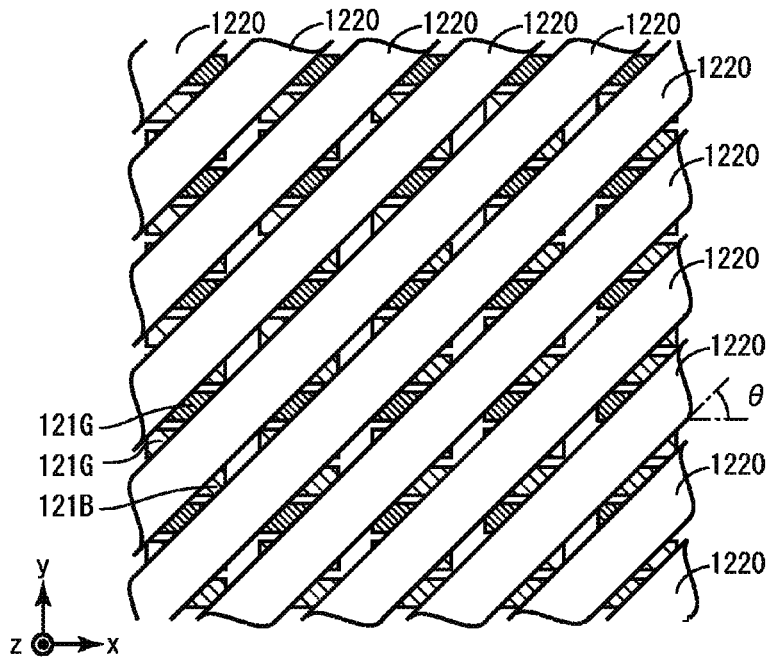
FIG. 7D is a plan view illustrating the color filter layer and the sensor pattern layer in an overlapped view, in a case where $\theta = a\tan(3 \times CFSY/CFX)$ is satisfied.

FIG. 7D is a view in a case where θ=a tan(3×CFSY/CFX) is set. In other words, FIG. 7D is a view in a case where the bias angle θ is set so that with a shift in the x direction over a distance equal to the pixel interval CFX, an edge of the electrode 1220 shifts in the y direction over a distance of three times the subpixel interval CFSY. When the aspect ratio of the pixel PX is 1, that is, CFX=3×CFSY, the bias angle θ is 45 degrees.

In this example, an area of the color filters of a particular color hidden behind the electrodes 1220 increases. In other words, as the angle of the electrodes 1220 increases, the pitch of clearances that do not interfere with the electrodes 1220 in the x direction (the same color) is narrow. When viewed in the y direction, colors other than the colors of light passing through the clearances interfere with the ITO region, which results in that hue is biased.

In this way, as the bias angle θ increases, an area where the same color is continuous in the x direction is narrower. On the other hand, in a case where the bias angle θ becomes large, an area where the color filters of a particular color are hidden behind the electrodes 1220 increases. The bias angle θ, therefore, preferably satisfies the following expression (3). As long as the bias angle θ is in such a range that the following expression (3) is satisfied, moire is not recognized, and the color balance is not lost, either.

$$a\,\tan(2/3 \times CFSY/CFX) \leq \theta \leq a\,\tan(2 \times CFSY/CFX) \tag{3}$$

[Exemplary Configuration]

Hereinafter, a more specific exemplary configuration of the present embodiment is described.

Touch-panel-equipped display devices were produced in such a manner that the aspect ratio of the pixel PX was set to 1, that is, the relationship of CFX=3×CFSY was fixed, while the pixel interval CFX, the sensor interval SY, and the bias angle θ were varied.

FIG. 8 is a table illustrating the relationship between the pixel interval CFX as well as the sensor interval SY, and the occurrence/non-occurrence of moire. In the fields of "Pitch ratio", the values of SY/CFX=SY/(3×CFSY) are indicated. In the fields of "Pixel pitch (μm)", the values of CFX are indicated. The bias angle was set to 30 degrees. "○" indicates that moire did not occur. "Δ" indicates that moire was at such a level that it could be confirmed with use of a microscope. "×" indicates that moire was at such a level that it was visually confirmed.

As illustrated in FIG. 8, it was proved that irrespective of the value of the pixel pitch, when the pitch ratio is in a range of 1.4 to 1.9, moire does not occur.

FIG. 9 is a table illustrating the relationship between the pixel interval CFX as well as the bias angle θ, and the occurrence/non-occurrence of moire. In the fields of "Conversion bias" in FIG. 9, values of the bias angle θ are indicated. The fields of "CFX" and "CFSY" indicate that the bias angle was set so that a shift of the distance indicated in the field of CFX in the x direction caused a shift of the distance indicated in the field of CFSY in the y direction. For example, in a case where "CFX" was "3 pixels" and "CFSY" was "4 pixels", this indicates that the bias angle was set so that a shift in the x direction over 3×CFX caused a shift in the y direction over 4×CFSY. In other words, θ=a tan(4/3×CFSY/CFX). Since CFX=3×CFSY, θ=a tan(4/9) is derived, which is about 24 degrees.

As illustrated in FIG. 9, it was proved that, though depending on the value of the pixel pitch, when the bias angle is in a range of 12 to 34 degrees, moire does not occur.

The above description describes the touch-panel-equipped display device 1 according to Embodiment 1 of the present invention. In the touch-panel-equipped display device 1, the sensor interval SY, the pixel interval CFX, the subpixel interval CFSY, and the bias angle θ satisfy the expressions (2) and (3). This makes it possible to suppress the occurrence of moire.

The present embodiment is described with reference to a case where both of the expressions (2) and (3) are satisfied, but the touch-panel-equipped display device 1 may satisfy the expression (2) exclusively, and does not have to satisfy the expression (3). Even in the case where only the expression (2) is satisfied and the expression (3) is not satisfied, effects are achieved to some extent regarding the suppression of moire.

[Embodiment 2]

A touch-panel-equipped display device according to Embodiment 2 of the present invention is identical to the touch-panel-equipped display device 1 except that a sensor pattern layer 222 is provided in place of the sensor pattern layer 122.

Figure 10:
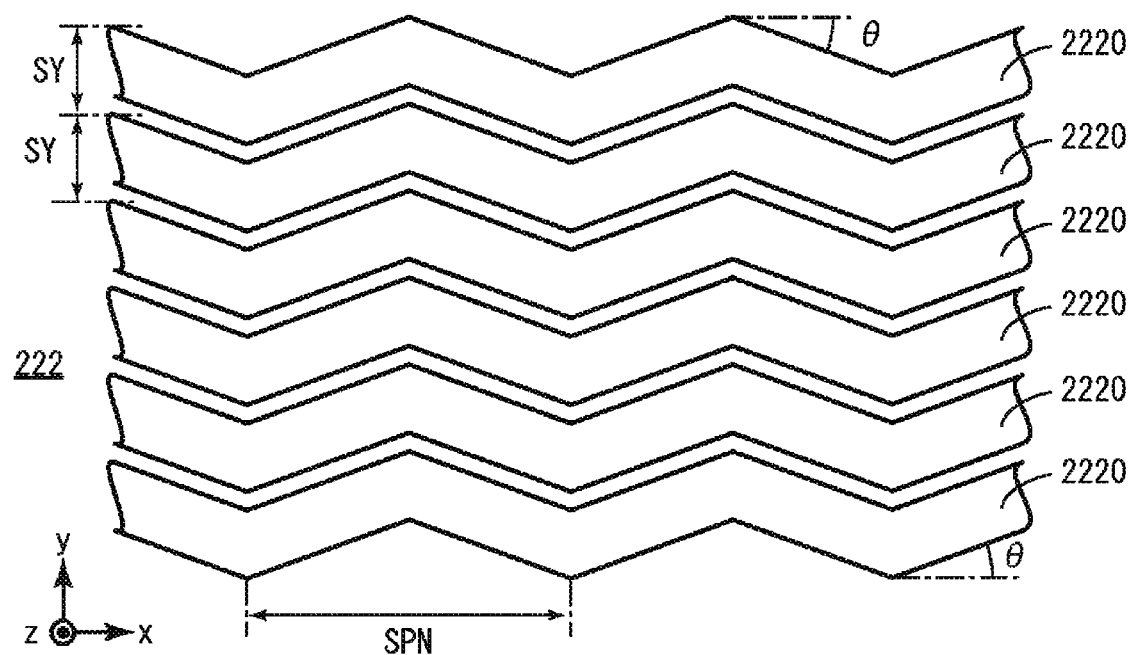
FIG. 10 is a plan view illustrating a configuration of a sensor pattern layer of a touch-panel-equipped display device according to Embodiment 2.

FIG. 10 is a plan view illustrating the configuration of the sensor pattern layer 222. The sensor pattern layer 222, as is the case with the sensor pattern layer 122, includes a plurality of electrodes 2220 arranged along the y direction at a sensor interval SY. Each of the electrodes 2220 is formed so as to have a bias angle θ between the same and the x direction.

Each of the electrodes 2220 is turned every ½ of a predetermined cycle SPN in the x direction in such a manner that the angle formed between the same and the x direction is reversed.

According to the present embodiment, the electrodes 2220 can be formed approximately in a linear form parallel to the x direction over a long section, which increases the degree of freedom for layout of the sensor pattern layer 220. Further, in a case where the electrodes 2220 are lines, the width of a space that the line occupies can be made narrower.

[Setting of cycle SPN]

FIGS. 11A to 11D are plan views illustrating the color filter layer 121 and four types of sensor pattern layers 222 that are different regarding the cycle SPN, respectively, in a state in which the color filter layer 121 and the sensor pattern layer 222 overlap each other.

Figure 11A:
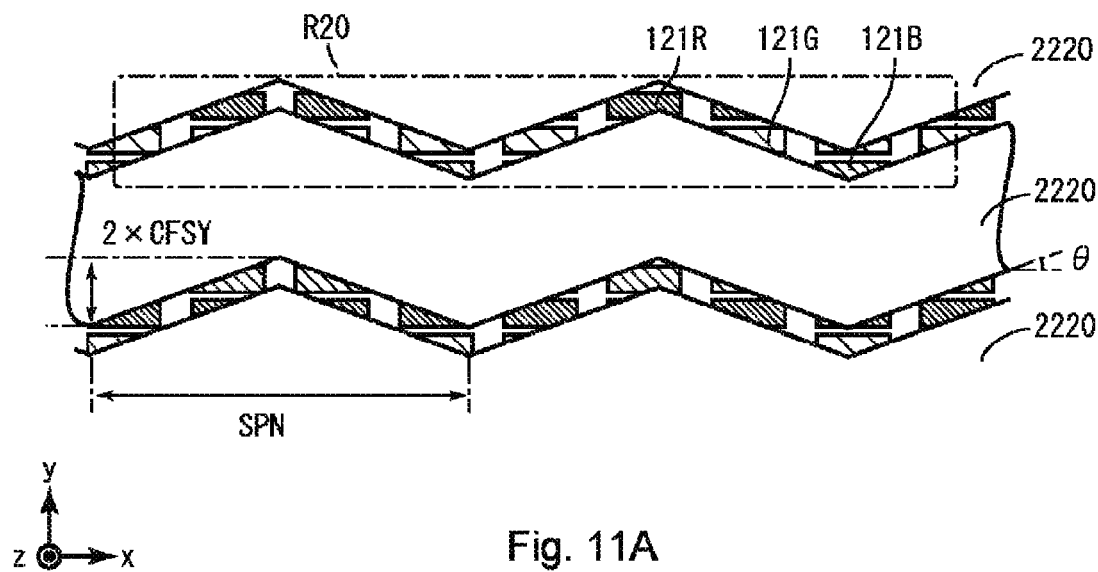
FIG. 11A is a plan view illustrating a color filter layer and the sensor pattern layer in an overlapped state, in a case where a cycle SPN is set so that at a position where an end of an electrode shifts in the y direction over a distance of twice a subpixel interval CFSY, the electrode is turned.

FIG. 11A is a view in a case where the cycle SPN is set so that when an end of the electrode 2220 shifts in the y direction over a distance of twice the subpixel interval CFSY, the electrode 2220 is turned. In other words, FIG. 11A is a view in a case where SPN=2×(2×CFSY)/TAN(θ). In this example, in the region R20, an area of overlap between parts without the electrodes 2220 and the color filters 121B is smaller as compared with an area of overlap between the parts without the electrodes 2220 and the color filters of the other colors.

Figure 11B:
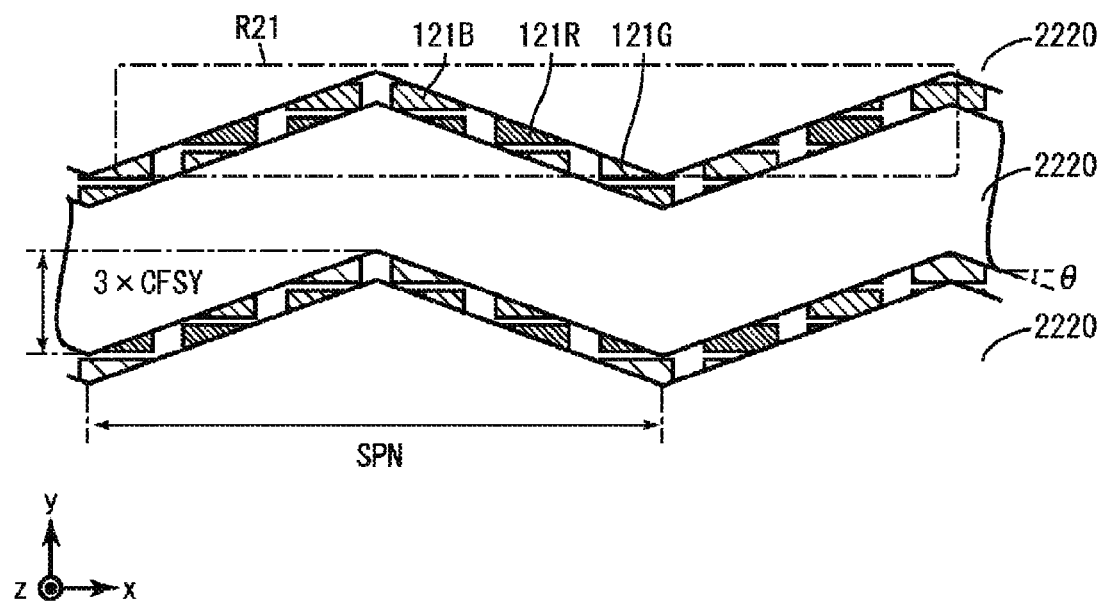
FIG. 11B is a plan view illustrating the color filter layer and the sensor pattern layer in an overlapped state, in a case where the cycle SPN is set so that at a position where an end of an electrode shifts in the y direction over a distance of three times the subpixel interval CFSY, the electrode is turned.

FIG. 11B is a view in a case where the cycle SPN is set so that an end of the electrode 2220 shifts in the y direction over a distance of three times the subpixel interval CFSY, the electrode 2220 is turned. In other words, FIG. 11B is a view in a case where SPN=2×(3×CFSY)/TAN(θ). In this example, in the region R21, respective areas of overlap between the parts without the electrodes 2220 and the color filters of respective colors are substantially equal to one another.

Figure 11C:
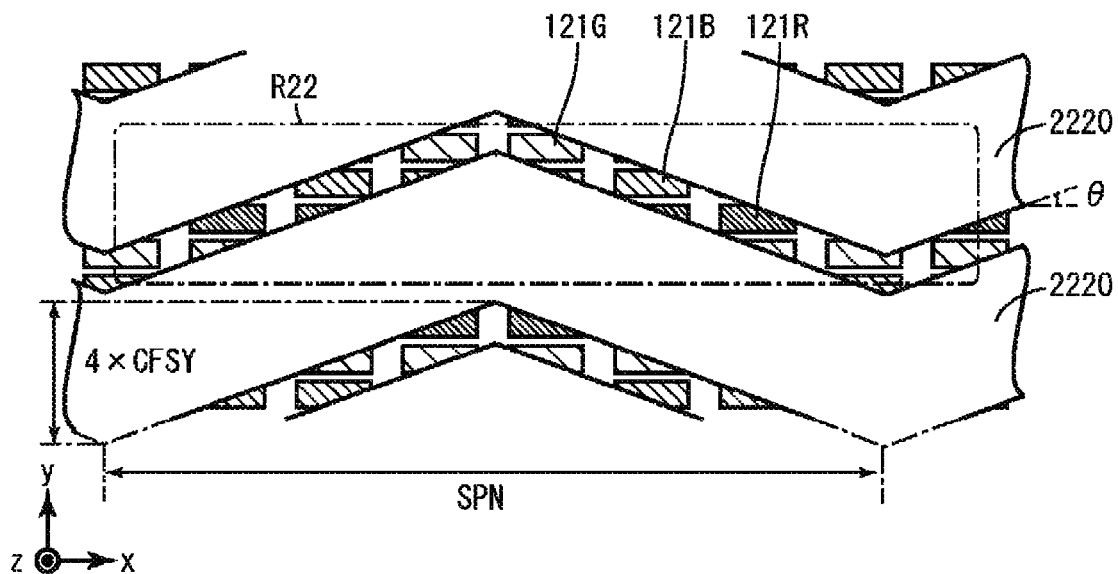
FIG. 11C is a plan view illustrating the color filter layer and the sensor pattern layer in an overlapped state, in a case where the cycle SPN is set so that at a position where an end of an electrode shifts in the y direction over a distance of four times the subpixel interval CFSY, the electrode is turned.

FIG. 11C is a view in a case where the cycle SPN is set so that an end of the electrode 2220 shifts in the y direction over a distance of four times the subpixel interval CFSY, the electrode 2220 is turned. In other words, FIG. 11C is a view in a case where SPN=2×(4×CFSY)/TAN(θ). In this example, in the region R22, respective areas of overlap between the parts without the electrodes 2220 and the color filters of respective colors are substantially equal to one another.

Figure 11D:
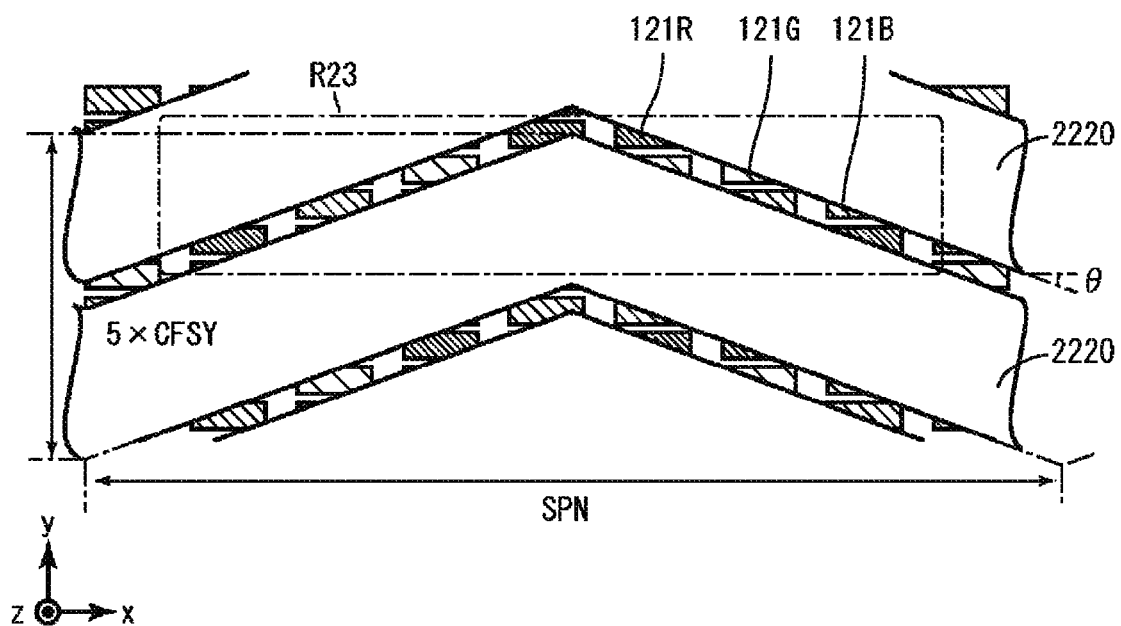
FIG. 11D is a plan view illustrating the color filter layer and the sensor pattern layer in an overlapped state, in a case where the cycle SPN is set so that at a position where an end of an electrode shifts in the y direction over a distance of five times the subpixel interval CFSY, the electrode is turned.

FIG. 11D is a view in a case where the cycle SPN is set so that an end of the electrode 2220 shifts in the y direction over a distance of five times the subpixel interval CFSY, the electrode 2220 is turned. In other words, FIG. 11D is a view in a case where SPN=2×(5×CFSY)/TAN(θ). In this example, in the region R23, respective areas of overlap between the parts without the electrodes 2220 and the color filters of respective colors are substantially equal to one another.

In this way, when the cycle SPN is 2×(3×CFSY)/TAN(θ) or more, the color balance is not lost. Therefore, the touch-panel-equipped display device preferably satisfies the following expression (4):

$$SPN \gtrsim (6 \times CFSY)/TAN(\theta) \tag{4}$$

On the other hand, as the cycle SPN is smaller, the amplitude of the electrode in the y direction can be decreased. From the viewpoint of the degree of freedom for layout of the sensor pattern layer 2220, therefore, the cycle SPN is preferably set as small as possible within such a range that the coloring balance is not lost. The touch-panel-equipped display device, therefore, more preferably satisfies the following expression (5):

$$SPN = (6 \times CFSY)/TAN(\theta) \tag{5}$$

The foregoing description describes the touch-panel-equipped display device according to Embodiment 2 of the present invention. According to the present embodiment, the degree of freedom for the layout of the electrodes 2220 can be improved.

[Other Embodiments]

The foregoing description describes the embodiments of the present invention, but the present invention is not limited to the embodiments mentioned above. Many variations can be made within the scope of the invention. Further, any of the embodiments can be combined appropriately and implemented.

As illustrated in examples of the above-described embodiments, moire occurs in the direction in which the color filters are aligned, when the sensor interval is close to an integer multiple of the size of the pixel. As the above-described embodiment, a case is described in which the sensor interval SY is set to CFSY×4 to CFSY×5, as a requirement for preventing the sensor interval from becoming an integer multiple of the pixel size. In other words, a case where the sensor interval SY is set to 4/3 times the pixel size to 5/3 times the pixel size is described.

On the other hand, since the sensor interval SY may not be an integer multiple of the pixel size, the sensor interval SY may be set to CFSY×7 to CFSY×8 (7/3 times the pixel size to 8/3 times the pixel size), or CFSY×10 to CFSY×11 (10/3 times the pixel size to 11/3 times the pixel size), ... or the like. In other words, the sensor interval SY may be set to CFSY×(3×m+1) to CFSY×(3×(m+1)−1) where m is a positive integer.

The present embodiment described above is described with reference to a case where the color filter layer includes the red color filters, the green color filters, and the blue color filters. The combination of the color filters, however, is not limited to the above-described combination.

Further, the color filter layer may include color filters of four or more colors. For example, the color filter layer may further include white color filters, in addition to the red color filters, the green color filters, and the blue color filters.

When the color filter layer includes n color filters where n is an integer of 3 or more, moire can be reduced, if the following expression (1) is satisfied:

$$CFSY \times (n \times m+1) \leq SY \leq CFSY \times (n \times (m+1)-1) \quad (1).$$

The invention claimed is:

1. A touch-panel-equipped display device, comprising:
   a color filter layer including a plurality of pixels that are arranged in matrix along a first direction and a second direction that intersect at a right angle; and
   a sensor pattern layer including a plurality of electrodes that are arranged along the second direction at a predetermined sensor interval SY, the sensor pattern layer being arranged so as to overlap the color filter layer when viewed in a direction vertical to the first direction and the second direction, wherein
   each of the pixels includes n color filters that transmit light in wavelength ranges different from one another, respectively, where n is an integer of 3 or more,
   the n color filters are arranged along the second direction at a predetermined subpixel interval CFSY,
   the sensor interval SY and the subpixel interval CFSY satisfy an expression (1) below:

$$CFSY \times (n \times m+1) \leq SY \leq CFSY \times (n \times (m+1)-1) \quad (1)$$

where m is a positive integer.
   the n representing the number of the color filters is 3, and an expression (2) below is satisfied:

$$CFSY \times 4 \leq SY \leq CFSY \times 5 \quad (2),$$

the pixels are arranged along the first direction at a predetermined pixel interval CFX,
   each of the electrodes are formed so that a bias angle θ is formed between each electrode and the first direction, and
   the subpixel interval CFSY, the pixel interval CFX, and the bias angle satisfy an expression (3) below:

$$a\tan(2/3 \times CFSY/CFX) \leq \theta \leq a\tan(2 \times CFSY/CFX) \quad (3).$$

2. The touch-panel-equipped display device according to claim 1,
   wherein each of the electrodes is turned every ½ of a predetermined cycle SPN along the first direction in such a manner that an angle formed between the electrode and the first direction is reversed, and
   the subpixel interval CFSY, the bias angle θ, and the cycle SPN satisfy an expression (4) below:

$$SPN \leq (6 \times CFSY)/\mathrm{TAN}(\theta) \quad (4).$$

3. The touch-panel-equipped display device according to claim 2,
   wherein the subpixel interval CFSY, the bias angle θ, and the cycle SPN satisfy an expression (5) below:

$$SPN = (6 \times CFSY)/\mathrm{TAN}(\theta) \quad (5).$$

* * * * *